United States Patent [19]

Inuzuka et al.

[11] 4,383,753
[45] May 17, 1983

[54] IMAGE FORMATION APPARATUS

[75] Inventors: Tsuneki Inuzuka, Machida; Masato Ishida; Yoshihiro Kawatsura, both of Kawasaki, all of Japan

[73] Assignee: Canon Kabushiki Kaisha, Tokyo, Japan

[21] Appl. No.: 166,963

[22] Filed: Jul. 8, 1980

[30] Foreign Application Priority Data

Jul. 16, 1979 [JP]   Japan ................................ 54-91158

[51] Int. Cl.³ ..................... G03G 15/00; G03G 15/28
[52] U.S. Cl. ....................................... 355/8; 355/3 R; 355/14 R; 335/206
[58] Field of Search .................. 355/14 R, 8, 66, 3 R; 335/206

[56] References Cited

U.S. PATENT DOCUMENTS

| 3,337,825 | 8/1967 | Brooks ................................ 335/206 |
| 3,672,762 | 6/1972 | Suzuki et al. ....................... 355/8 X |
| 3,733,124 | 5/1973 | Tanaka et al. ...................... 355/8 X |
| 3,918,806 | 11/1975 | Cook ................................... 355/8 |
| 4,112,401 | 9/1978 | Palmer et al. ...................... 335/206 |
| 4,148,578 | 4/1979 | Bujese ................................. 355/8 |
| 4,158,499 | 6/1979 | Hattori et al. ...................... 355/8 |
| 4,171,901 | 10/1979 | Takizawa et al. ................... 355/8 |
| 4,256,399 | 3/1981 | Ikeda .................................. 355/8 |

Primary Examiner—A. C. Prescott
Attorney, Agent, or Firm—Fitzpatrick, Cella, Harper & Scinto

[57] ABSTRACT

An image formation apparatus has a reciprocally movable member for scanning an original document, a device for forming an image on the basis of the scanned image by the reciprocally movable member, a driver for driving the reciprocally movable member to move the member in a predetermined direction, and a controller for controlling the driving means to drive the reciprocally movable member in the opposite direction near a predetermined position to stop the member at the predetermined position.

11 Claims, 12 Drawing Figures

IMAGE FORMATION APPARATUS

BACKGROUND OF THE INVENTION

1. Field of the Invention

This invention relates to an image formation apparatus such as a copying or duplicating machine having a reciprocally movable member for image formation, and more particularly to a drive control therefor.

2. Description of the Prior Art

In a slit exposure copying machine, an optical system such as a lamp and mirrors or a movable member such as an original document carriage supporting an original document thereon is repetitively moved forward and backward by an electromagnetic clutch or the like a number of times to thereby expose and scan an image of the original.

In such a copying machine, when the movable member is to be stopped at a predetermined position after the termination of the last exposure, it is difficult because of the inertia or the like of the movable member to stop the movable member at the predetermined position simply by cutting off the power supply to the electromagnetic clutch. Particularly, where the movable member is an original carriage, the stop position thereof becomes irregular due to the weight of an original thereon and in addition, the original carriage still moves for a little while after the power supply to the clutch has been cut off, and then stops, thus giving unpleasantness to the operator.

It is known to provide a mechanical stop or the like at the stop position to enable the movable member to be stopped at the predetermined position. However, a complex stop mechanism is necessary to prevent noise or shock which would result from the movable member striking against the mechanical stop.

Further, in a compact copying machine, for example, a copying machine wherein the original carriage is moved from the central portion of the apparatus to one end, whereafter it is moved forward in the other direction to thereby effect exposure and scanning and after the termination thereof, the original carriage is returned and stopped at the central portion, the provision of said stop at the central portion to stop the original carriage at a predetermined position would become a hindrance to the forward exposure movement.

Also, as a simple, position detecting element for the movable member in a reciprocal movement exposure type apparatus, there has heretofore been a combination of a microswitch and a cam or a combination of a light-emitting device and a light-receiving device. However, these have their own functional demerits. First, a microswitch has difficulties in life and cam arrangement accuracy, and the use of a light-receiving device suffers from a problem that it is subject to contamination.

Especially, a non-contact type position detecting device is limited in its sensing range. Consequently, if such a device is used for the detection of the stop position of the aforementioned compact copying machine, the original carriage may be moved to one end of the apparatus past the central stop position. Also, if that detecting device is used for the detection of the exposure start position, it will sometimes be impossible to start the exposure when the movable member for exposure scanning is deviated a little from the position of the detecting device.

SUMMARY OF THE INVENTION

It is an object of the present invention to provide an image formation apparatus which eliminates the above-noted disadvantages.

It is another object of the present invention to improve the control of a copying machine having a reciprocally movable member.

It is still another object of the present invention to provide a compact copying machine in which noise and shock of the movable portion are minimized in connection with control.

It is yet still another object of the present invention to provide an improvement in a copying machine for stopping the reciprocally movable member at a predetermined position after termination of image formation.

It is a further object of the present invention to provide a copying machine in which the braking portion of the scanning movable member is simplified.

It is still a further object of the present invention to provide an image formation apparatus using a position detecting device improved to appropriately effect the start and stoppage of the scanning.

BRIEF DESCRIPTION OF THE DRAWINGS

These and other objects of the present invention will become apparent from the following detailed description of an embodiment thereof taken in conjunction with the accompanying drawings, in which.

DESCRIPTION OF THE PREFERRED EMBODIMENT

An embodiment of the present invention will hereinafter be described with reference to the drawings.

Figure 1:
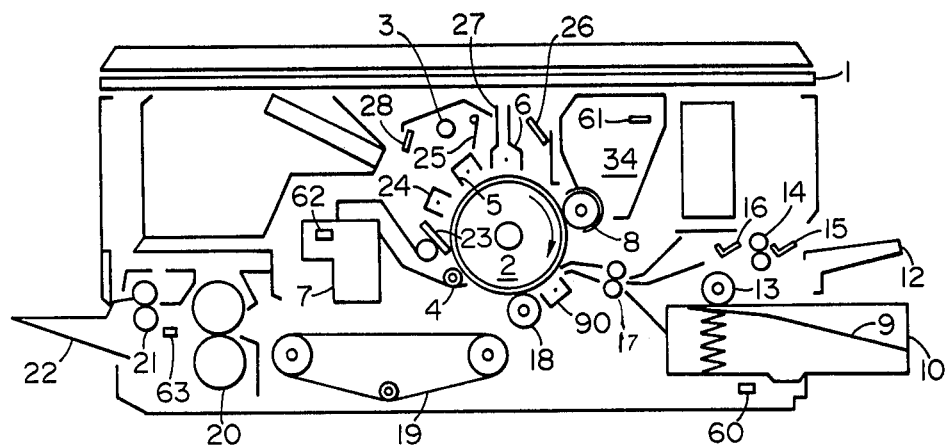
FIG. 1 is a cross-sectional view of an image formation apparatus according to the present invention.

Referring to FIG. 1 which is a cross-sectional view of the copying or duplicating machine according to the present invention, it includes a reciprocally movable platen 1 on which an original document is placed, a rotatable drum 2 having a seamless photosensitive medium on its periphery, a lamp 3 for projecting an image of the original on the platen 1 onto the drum 2, a corona charger 5 for pre-charging the surface of the photosensitive medium to the positive polarity, a corona charger 6 for discharging the surface of the photosensitive medium to the negative polarity simultaneously with the application of the image thereto, a developing device 8 for developing an electrostatic latent image, a charger 90 for transferring the developed image to transfer paper 9, a cassette 10 containing therein a number of sheets of transfer paper 9 and removable with respect to the machine body, a bed 12 for manually supplying transfer paper, a roller 13 for feeding the transfer paper from the cassette, rollers 14 for feeding the transfer paper from the manual supply bed 12, microswitches 15 and 16 for detecting the manually supplied transfer paper, register rollers 17 for registering the leading end of the transfer paper to the leading end of the image on the drum, a roller 18 for separating the transfer paper from the drum, a belt 19 for conveying the transfer paper, fixing rollers 20, rollers 21 for discharging the transfer paper onto a tray 22, a blade cleaner 23 for removing any toner remaining on the drum, a magnet roller 4 for collecting the toner removed by the blade 23, a container 7 for containing therein the toner collected by the roller 4, a negative corona charger 24 for removing any charge remaining on the drum, a shutter 25 for imparting the light from the exposure lamp 3 directly to the drum's exposed surface for a predetermined time, mirrors 26 and 28 for imparting the light from the lamp 3 directly to the drum surface, and a cellfock lens 27 for imaging the reflected light of the lamp 3 from the original on the drum surface. Designated by 36 is a stop for preventing over-running of the original carriage, which is free to move during non-copying.

Operation will now be described. When a main switch is closed, a motor (main drive surface) for driving the drum 2 is energized and the lamp 3 is turned on while the shutter 25 is opened and the corona charger 6 is energized and the drum 2 is rotated. Thereby, the drum surface is pre-cleaned to remove any remaining toner, any remaining charge and memory. When the fixing rollers 20 reach a fixation-capable temperature due to a heater disposed therewithin, a copying-capable signal is generated. Where a copy switch is not closed, the drum still continues to rotate after that and, when a predetermined number of pulses from a rotary encoder provided in the drum driving system which generates n pulses per full rotation of the drum has been counted, the drum stops rotating. The above-described drum rotation is referred to as a first pre-rotation.

When the copy switch is closed during rotation or stoppage of the drum, the shutter 25 is closed to rotate the drum 2 again and after substantially one full rotation (hereinafter referred to as a second pre-rotation) of the drum, the platen 1 starts its forward movement and the slit exposure of the original on the platen 1 is started. The reflected image of the lamp 3 is slit-projected upon the drum through the cellfock lens. The photosensitive medium of the drum 2 comprises, in succession from its surface, an insulating layer, a photoconductive layer and an electrically conductive layer and, when the surface thereof charged by the charger 5 reaches the exposed surface, the positive charge thereon is discharged by the negative charger 6 and optical image. When that surface reaches the uniformly exposed surface, an electrostatic latent image of high contrast is formed on the drum surface by the light from the mirror 26. Toner is imparted to the latent image in the developing area to visualize it. The visualized image is transferred to transfer paper by the positive potential of the transfer charger in the image transfer area. The transfer paper has been separated and fed from the cassette 10 by the timing operation of the paper feed roller 13, and passes through the image transfer area at the same speed as the peripheral speed of the drum with the aid of the register rollers 17. After the image transfer, the transfer paper is separated from the drum by the roller 18 and conveyed to the fixing rollers 20 by the belt 19, and the image on the transfer paper is fixed thereby, whereafter the paper is discharged onto the tray 22 by the rollers 21. After completion of the image transfer, the drum surface is cleaned by the blade 23 and discharged by the charger 24 and the memory on the drum surface is removed by the light from the lamp 3 via the mirror 28.

Where continuous copying of the same original is to be effected, the platen 1 repeats its reciprocal movement a number of times set by the ten key of the operating portion of the copying machine.

Figure 2:
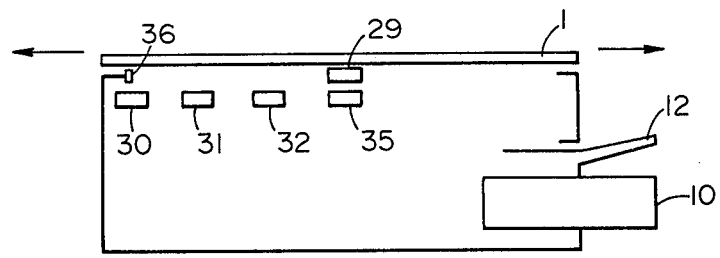
FIG. 2 is a cross-sectional view of the original carriage portion in FIG. 1.

Referring to FIG. 2 which shows the portion around the platen, there is a magnet 29 on the platen, and position detecting reed switches 30, 31, 32 and 35 adapted to be actuated by the passage of the magnet are disposed on the movement path of the platen. When the magnet is sensed by the switch 35, the original carriage is stopped at its initial position lying at the center of the machine body and, when the copy switch is closed, the original carriage is moved backwardly or leftwardly to start exposure and, when it is sensed by the switch 30, the original carriage is changed over to rightward or forward movement for exposure. At the moment when the switch 30 has sensed the magnet 29, the change-over of the direction of movement must be effected usually with a shock absorbing effect to reduce sound and shock and accordingly, after the original carriage has over-run leftwardly by about 20 mm, the actual direction of movement is changed over. At this time, the original carriage does not strike against the mechanical stop 36. Also, even when the original carriage has been fully moved leftwardly until it strikes against the mechanical stop, the switch 30 must be sensing the magnet 29 so that the platen can start upon depression of a start key. When the copy switch is closed in this condition, the above-described leftward movement of the original carriage is omitted, that is, the original carriage can effect its rightward or forward movement to start exposure.

The switch 31 is one for feeding paper by the paper feed rollers 13, 14 and the switch 32 is one for feeding paper by the register rollers 17. In the case of continuous copying, when the first slit scanning has been terminated and the original carriage has been reversed in direction from the forward movement to the backward movement and is moved backwardly to close the switch 30, the original carriage again starts its forward movement and effects the second scanning. In this manner, a set number of copies may be produced. The lamp 3 and the simultaneous charger 6 are switched on and off in synchronism with the main motor, namely, the rotation of the drum, and the primary charger 5 and the pre-charger 24 are switched on except during the post-rotation cycle. The lamp 3 is a halogen lamp which is controlled so as to provide a high intensity of light during the time that the original carriage effects scanning movement (forward movement). If the timing of the change-over to the intense light is set to a little time after the timing of the change-over from the backward movement to the forward movement and the timing of the change-over to the weak light is set to a little time after the timing of the change-over from the forward movement to the backward movement, the shock of the original carriage during the change of its direction of movement can be made to correspond to that during the weak light.

Figure 3:
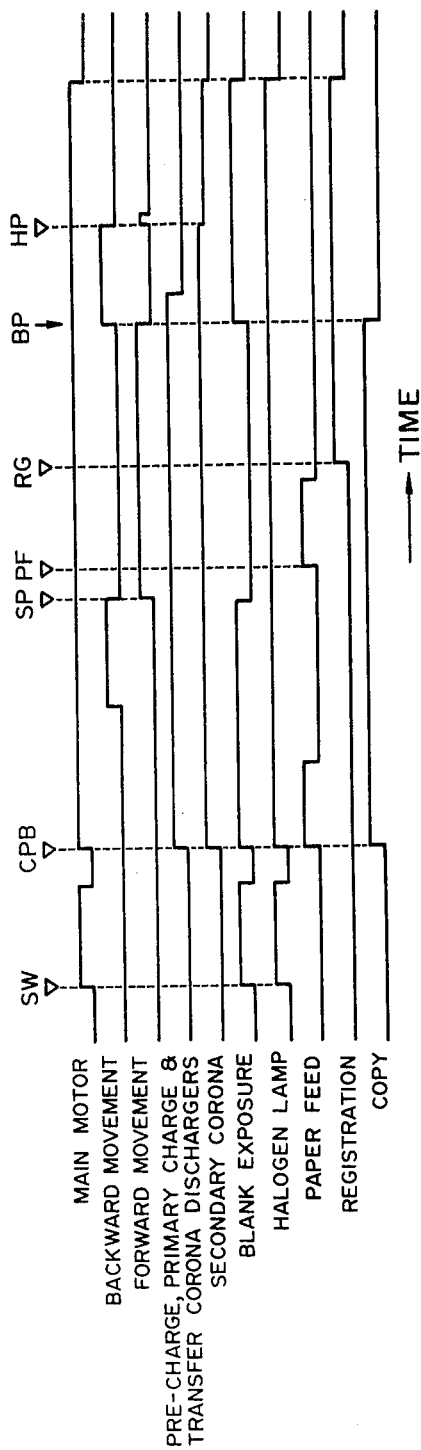
FIG. 3 is an operation time chart of the FIG. 1 apparatus.

With reference to FIG. 3 which is the operation time chart of the FIG. 1 copying machine, description will now be made chiefly of the operation sequence and operation timing of the scanning.

Before the copy switch 40 is closed, the platen 1 is positioned centrally of the machine body as shown in FIG. 1. When the copy switch 40 is closed, the pre-discharging charger 24, lamp 3, primary charger 5, secondary charger 6, image transfer charger 90 and shutter 25 are switched on and precorona, primary corona, secondary corona, image transfer corona, pre-discharging exposure, blank exposure and uniform exposure are imparted to the photosensitive medium, which thus becomes ready to start copying. The lamp 3 is turned on with weak light.

When a predetermined number of said pulses has been counted, namely, when the drum has made a predetermined rotation (the second pre-rotation), the platen 1 starts to move leftwardly from the position of FIG. 1 and thereafter, when the drum has made substantially one full rotation, the switch 30 senses the magnet 29 to stop the platen and start to move the platen rightwardly for exposure. The lamp 3 is turned on with intense light and the shutter is switched off to stop the blanket exposure and effect the exposure. The blanket exposure is for applying light to the image exposure surface when the image exposure is not taking place, thereby preventing irregularity of potential from being produced on the photosensitive medium.

After the image exposure has been effected during substantially one and half rotation of the drum, the movement of the platen 1 is stopped and the platen is moved leftwardly. The start of this movement is effected by counting a predetermined number of said pulses. For example, the count is effected after the switch 32 has been closed. Also, at this period, the number of the ten key set in the memory is set in a copy counter register and −1 from that number is effected. As a result, in the case of a single copy production, the register becomes 0 and therefore, the re-start of the subsequent copying is prevented.

During this rightward or forward movement, the reed switch 31 of FIG. 2 senses the magnet 29 and operates the paper feed rollers 13, 14 and the reed switch 32 is sensed to operate the register rollers 17, thus feeding a sheet. Even if the reed switches 31, 32 sense the magnet 29 during the movement of the platen except during the exposure, the rollers 13, 14 and 17 are not operated.

Figure 4:
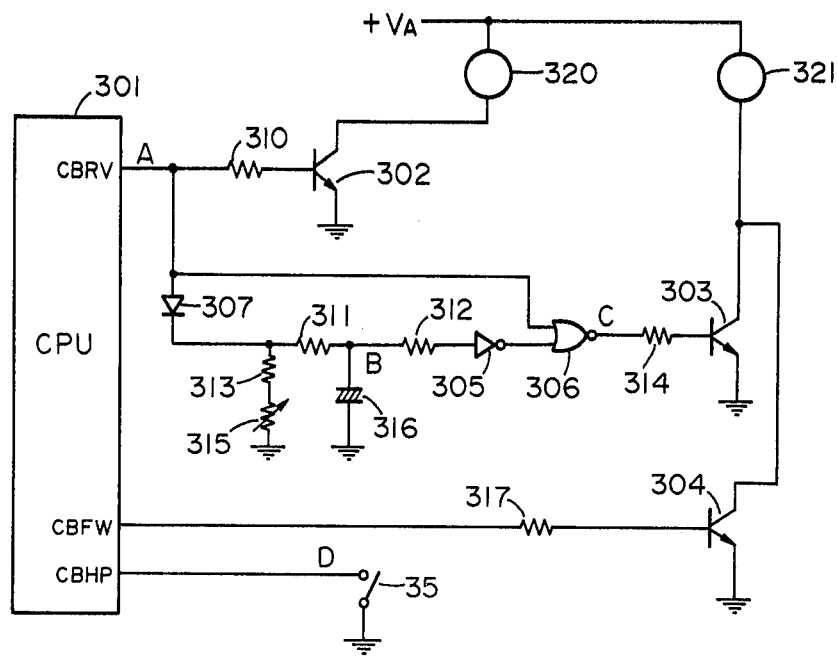
FIGS. 4, 6A and 6B are schematic diagrams of the platen operation control circuits.

When the magnet 29 of the platen 1 is sensed by the switch 35 at its initial position, the movement of the platen is stopped. The lamp 3 is controlled to weak turn-on and the shutter is switched on to start blanket exposure by the weak turn-on of the lamp 3. Thereafter, the drum rotation continues and in the meantime, the photosensitive medium is electrically and mechanically cleaned and after substantially one full rotation thereof, the process load as shown in FIG. 4 is switched off and the drum rotation is stopped. After this stoppage, the power source ON condition continues.

In the case of continuous copying, even if the switch 35 senses the magnet, the platen 1 is not stopped but continues to move leftwardly and, when the switch 30 senses the magnet, rightward movement of the platen 1 is again started and the lamp 3 is turned on with intense light and the shutter is switched off to re-start the image exposure.

The time at which the rightward movement for exposure is stopped and the direction of movement is changed over is determined in accordance with the size of the sheets in the cassette 10.

Figure 5:
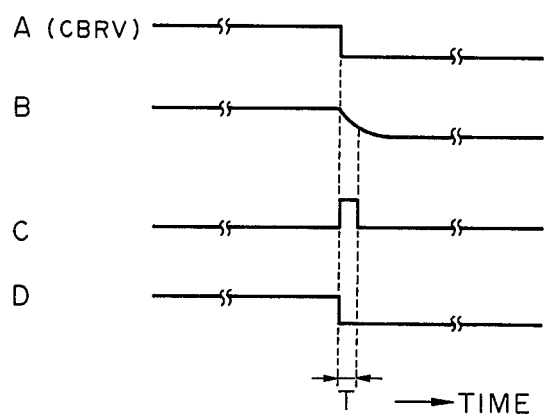
FIGS. 5 and 7 are operation time charts of the circuits of FIG. 4 and 6A.

FIG. 4 shows an example of the circuit for controlling the reciprocal movement of the original carriage 1, and FIG. 5 is the operation time chart thereof.

In FIG. 4, reference numeral 301 designates a sequence controller CPU for controlling the operation of the FIG. 1 copying machine and it controls each load in accordance with the time chart shown in FIG. 3. Designated by 320 and 321 are electromagnetic clutches for moving the original carriage backwardly and forwardly, respectively, and transmitting the power of the aforementioned main drive source to the original carriage. These clutches are driven by transistors 302, 303 and 304. In FIG. 4, CBRV is an original carriage backward movement signal and CBFW is an original carriage forward movement signal. In FIG. 5, A is an original carriage backward movement signal, B is the terminal voltage of a capacitor 316, C is the output of a NOR gate 306 and D is the output of the switch 35.

Operation will now be described. When the original carriage forward movement signal CBFW is put out from the sequence controller CPU by the reed switch 30 at its start position as shown in the time chart of FIG. 4, the transistor 304 is turned on through a resistor 317 to operate the original carriage forward movement clutch 321, which thus moves the original carriage rightwardly or forwardly. After the start of the forward movement, when a predetermined number of pulses has been counted as already described, the signal CBFW is stopped from being developed and the forward movement clutch 321 becomes inoperative. Subsequently, to return the original carriage 1 toward the reed switch 35 at its stop position, the output of the backward movement signal CBRV is set. The transistor 302 is turned on through a resistor 310 to operate the backward movement clutch 320, which thus moves the original carriage 1 backwardly. At this time, the signal CBRV is applied as input to the NOR gate 306 to render the output of this gate into 0 and the transistor 303 holds its OFF state.

The original carriage continues its backward movement and when it comes to the position of the reed switch 35 installed at the original carriage stop position, the outputting of signal CBRV is stopped to stop the original carriage. At this time, the transistor 302 is turnd off to cut off the power supply to the backward movement clutch 320 and 0 is applied as input to one terminal of the NOR gate 306. At this time, the terminal voltage of the capacitor 316 is discharged on the route of resistors 311, 313 and variable resistor 315 as shown by B in FIG. 5 and generates a backward movement signal delayed by a predetermined time period T and this signal is applied as input to an inverter 305 and further transmitted to the other input terminal of the NOR gate 306. Therefore, the output of the NOR gate 306 puts out a pulse of time T as shown by C in FIG. 5. This signal is transmitted to the transistor 303 through a resistor 314 to drive the forward movement clutch 321 for the time T. Therefore, the original carriage 1 suddenly takes the drive in the opposite direction from the forward movement clutch and accordingly negates the inertia of the backward movement and can smoothly stop at a predetermined position. Also, by regulating the time T by varying the variable resistor 315, the adjustment of the stop position can be made. This is also applicable to a case where the original carriage is stopped by counting a predetermined number of said pulses.

Figure 6A:
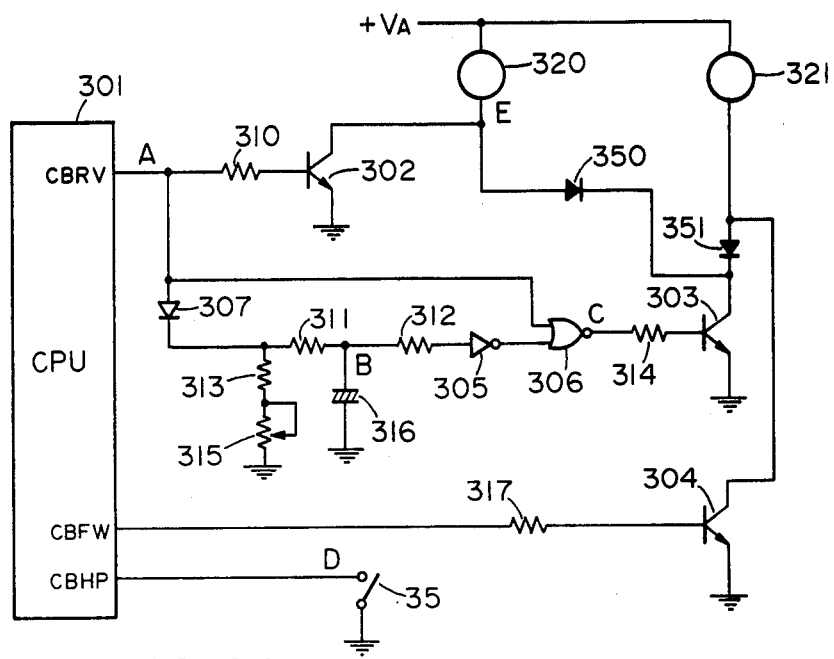
Figure 6B:
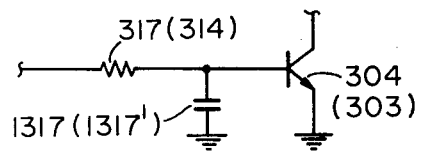
Figure 7:
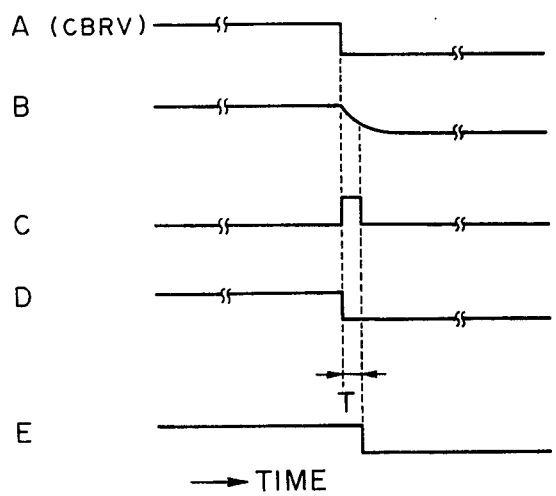
Figure 8A:
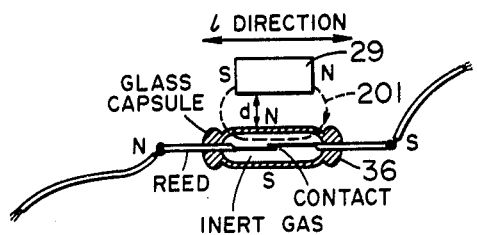
FIGS. 8A and 9A are cross-sectional views of reed switches.
Figure 8B:
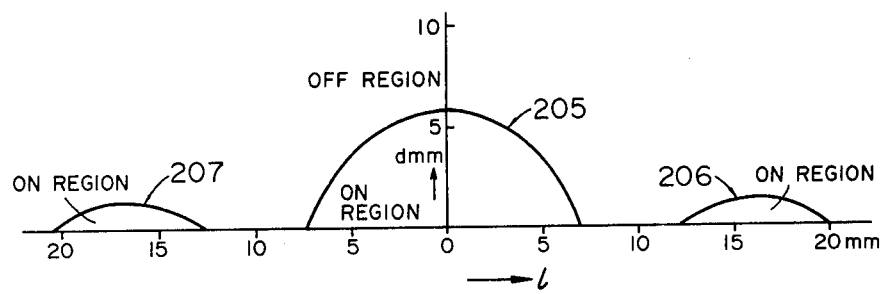
FIGS. 8B and 9B illustrate the characteristics of the reed switches of FIGS. 8A and 9A.

FIGS. 6A and 6B show another example of the circuit of the present invention and FIG. 7 is the time chart therefor. The circuit operation is substantially the same as that of FIG. 5 and identical elements are given identical reference numerals, and diodes 350 and 351 are added as shown. E in FIGS. 8A and 8B show the operation of the backward movement clutch 320.

The original carriage stop (rest) timing corresponds to the weak turn-on of the lamp 3 and therefore, the lamp break-off which would otherwise result from shock can be prevented and the life of the lamp can be increased by the change-over between the intense turn-on and the weak turn-on.

When the transistor 303 is turned on for the time T, not only the forward movement clutch 321 is driven but also the backward movement clutch 320 is again driven through the diode 350 to reduce the shock resulting from the forward movement clutch. That is, the forward movement clutch 321 and the backward movement clutch 320 are operated simultaneously to eliminate the inertia of the backward movement of the original carriage 1 and enable the original carriage to be smoothly stopped at a predetermined position.

In the case of continuous copying run, the operation of FIGS. 5 and 7 takes place so that the reciprocal movement of the original carriage 1 is repeated a number of times corresponding to the number of copies required and the original carriage 1 is stopped at the position of the switch 35 only when the last copy has been completed. This is because, in CPU 301, the input signal HP of the switch 35 is neglected until said number of copies is counted up.

Also, during copy run start or during continuous copying run, when the original carriage 1 is moved backwardly to its start position and reaches the start switch 30 (generates a signal SP), the backward movement signal is reset and as described above, the transistor 303 is turned on for the time T. However, at this time, the forward movement signal CBFW is also put out as shown in the time chart of FIG. 3 and the transistor 304 is turned on through the resistor 317 in FIG. 5 and the forward movement clutch 321 is driven, so the inertia of the backward movement can be eliminated. Also, even if there is the circuit of FIG. 4, 6A or 6B, there occurs no inconvenient problem.

In the case of FIGS. 6A, 6B and 7, depending on the adjustment of the resistor 315, a backward movement force can be left at the initial stage of the forward movement when the original carriage is moved forwardly from its start position. By this, soft starting of the forward movement can be accomplished and the shock during the start can also be alleviated. This also holds true when the forward movement force is left at the initial stage of the backward movement whereat the forward movement is changed to the backward movement.

Also, in any of the above-described cases, if a capacitor 1317 (1317') as shown in FIG. 6B is provided in FIG. 4 and 6A, a weak current lower than the rated current can be supplied to the clutch 321 at the initial stage of the forward movement operation and/or at the stoppage of the backward movement. Thereby, soft starting and smooth stoppage of the original carriage can be accomplished optimally.

Thus, the following point is also applicable to a case where the original carriage is fixed and the lamp-mirror system is reciprocally moved as previously described to effect the drum scanning.

A reed switch as the above-described position detecting means will now be described in greater detail.

The construction and characteristics of the commercially available reed switches are shown in FIGS. 8A, 8B, 9A and 9B.

The reed switch of FIG. 8A is a normally open contact type reed switch which is common as a position detecting means. When the magnet 29 and the reed switch 36 become opposed and close to each other as shown, a magnetic line of force actuates the reed piece of magnetic material as indicated at 201 to close the contact thereof. The use of this type of reed switch as the position detecting means, as compared with the use of other position detecting means, is excellent both in terms of life and temperature characteristic and is also advantageous in preventing the contamination by toner or the like in a copying apparatus, but such reed switch has disadvantages which will be shown below.

The characteristic when the magnet has been moved to left and right in the direction of l is such as shown in FIG. 8B and where the distance d between the magnet 29 and the reed switch 36 is small, the reed switch has three sensing regions represented by characteristic curves 207, 205 and 206 corresponding to the distance d and accordingly, when this switch is actually installed in a copying apparatus, it will become an unstable position detecting means due to irregularities of the magnet intensity, the sensitivity of the reed switch and the distance d.

Further, as a position detecting means for stopping the platen in anticipation of some over-run thereof, like the reed switch 30 shown in FIG. 2, a length which continues to sense to some extent in the direction of l (a sensing length) is necessary and particularly in the reed switch 30, the overrun region 20 mm and the distance of 5 mm from the position whereat the movement of the original carriage is changed over to the aforementioned mechanical stop 36, total 25 mm, is necessary. In this case, in the reed switch shown in FIG. 8A, if the length of the magnet 29 in the direction l is increased to increase the sensing length, the characteristic curve 205 in FIG. 8B will become relatively small in the direction d as compared with the characteristic curve 206 and 207, so that the detection accuracy will become more unstable.

Figure 9A:
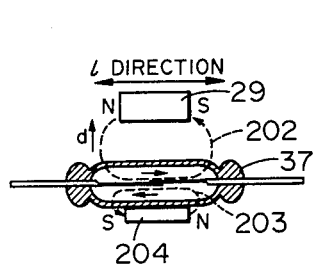

To overcome these disadvantages, the present invention is characterized by using a reed switch shown in FIG. 9A as the position detecting means (30, 31, 32, 35 in FIG. 2) of the moving member, for example, the original carriage, of a copying apparatus. That is, the present invention employs a normally closed contact type reed switch instead of the normally open contact type reed switch shown in FIG. 8A.

As shown in FIG. 9A, a bias magnet is mounted on a reed switch 37. When the magnet 29 mounted on the moving member is not present, the magnetic line of force 203 of the bias magnet 204 flows as shown and the contact is in ON position. When the magnet 29 has come close to the reed switch as shown, a magnetic line of force 202 acts in a direction to negate the magnetic line of force 203 and the contact becomes open to sense the magnet 29. However, at this time, the polarities of the bias magnet 204 and the magnet 29 must be opposite to each other, as shown.

Figure 9B:
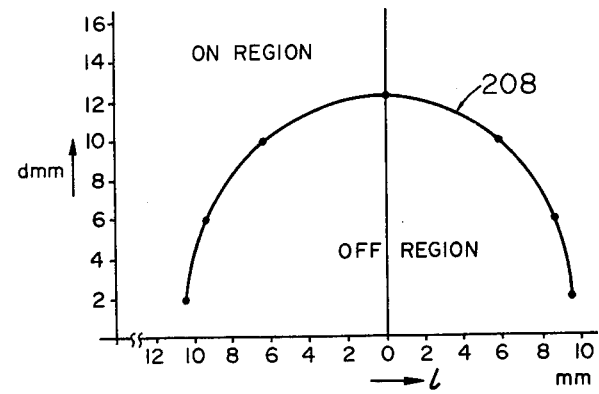

In this construction, the sensing characteristic when the magnet 29 has been moved in the direction l is such that a single sensing region is provided as shown in FIG. 9B, and accordingly a stable sensing characteristic is obtained. Consequently, the sensing length becomes double that of FIG. 8B, and the direction change and stoppage or rest of the platen can be accomplished appropriately. The sending length can be made further greater by increasing the length of the magnet 29.

Consequently, even if the platen is a little spaced from the switch 30 of FIG. 2, the forward movement of the platen can be started. Also, if this reed switch is used as the switch 35, the platen can be prevented from passing the stop position of the switch 35 and the effect of stopping the platen at a predetermined position can be enhanced.

As described above, by applying the reed switch to the detection and control of the moving member such as the original carriage of a copying apparatus, it is possible to eliminate the disadvantages peculiar to the construction shown in FIG. 8A.

What we claim is:

1. Image formation apparatus comprising:
   a reciprocally movable member for scanning an original document;
   means for forming an image on the basis of the scanned image by said reciprocally movable member;
   first drive means for moving said reciprocally movable member in one direction;
   second drive means for moving said reciprocally movable member in the opposite direction; and
   control means for energizing said second driving means to stop said reciprocally movable member at a predetermined position when said reciprocally movable member is moving in said one direction.

2. Image formation apparatus according to claim 1, further comprising means for detecting the stop position of said reciprocally movable member, wherein said control means controls said second drive means by said detecting means.

3. Image formation apparatus according to claim 1, wherein said second drive means includes a clutch for transmitting a drive force to said member, and said control means temporarily operates said clutch for movement in the opposite direction to stop the movement of said member in the one direction.

4. Image formation apparatus according to claim 2, wherein said control means operates a first clutch for movement in the one direction and a second clutch for movement in the opposite direction simultaneously to stop the movement of said member in the one direction.

5. Image formation apparatus comprising:
   a reciprocally movable member for scanning an original document;
   means for forming an image on the basis of the scanned image by said reciprocally movable member;
   drive means for applying drive force to said reciprocally movable member in opposite directions to reciprocate said member; and
   means for controlling said drive means so as to apply the drive force instantaneously to said reciprocally movable member in one direction when it is moving in the opposite direction.

6. Image formation apparatus according to claim 5, wherein said control means is adapted to control said drive means such that the drive force in the one direction is applied to said reciprocally movable member at least near the home position thereof.

7. Image formation apparatus according to claim 5, wherein said control means is adapted to control said drive means such that the drive force in the one direction is applied to said reciprocally movable member to stop it after the drive force in the opposite direction is applied to said reciprocally movable member.

8. Image formation apparatus comprising:
   a reciprocally movable member for scanning an original document;
   means for forming an image on the basis of the scanned image by said reciprocally movable member;
   means for applying drive force to said reciprocally movable member to reciprocate it; and
   means for controlling said drive force applying means such that a drive force is instantaneously applied to said reciprocally movable member in one direction at least near the home position thereof when said reciprocally movable member is moving in the opposite direction.

9. Image formation apparatus comprising:
   a reciprocally movable member for image formation;
   means for detecting the position of said reciprocally movable member, said means including a magnetically biased magnet switch which is a normally closed contact switch; and
   means for effecting the control for image formation in response to the change of the switch condition of said magnet switch.

10. Image formation apparatus according to claim 9, wherein said control means stops the movement of said reciprocally movable member by the signal from said magnet switch and a repetitive image formation termination signal.

11. Image formation apparatus according to claim 9, wherein said control means moves said reciprocally movable member in a forward direction in response to the signal from said magnet switch and an image formation starting signal to start document exposure.

* * * * *